United States Patent [19]

Brindöpke

[11] Patent Number: 4,837,271
[45] Date of Patent: Jun. 6, 1989

[54] CURABLE MIXTURES AND THEIR USE

[75] Inventor: Gerhard Brindöpke, Frankfurt am Main, Fed. Rep. of Germany

[73] Assignee: Hoechst AG, Fed. Rep. of Germany

[21] Appl. No.: 210,632

[22] Filed: Jun. 23, 1988

[30] Foreign Application Priority Data

Jun. 25, 1987 [DE] Fed. Rep. of Germany ....... 3720984

[51] Int. Cl.⁴ ............................................. C08G 16/04
[52] U.S. Cl. ................................ 525/330.3; 525/426; 525/445; 525/455; 525/502; 528/75; 528/106; 528/159; 528/205; 536/76
[58] Field of Search ...................... 525/330.3, 426, 445, 525/455, 502, 529; 528/75, 106, 159, 205, 272, 392; 536/76

[56] References Cited

U.S. PATENT DOCUMENTS 4,255,538 3/1981 Skillicom ............................ 528/392

Primary Examiner—Maurice J. Welsh
Attorney, Agent, or Firm—Bierman and Muserlian

[57] ABSTRACT

Curable mixtures based on
(A) compounds containing hydroxyl groups,
(B) curable compounds,
(C) catalysts and
(D) if appropriate a diluent and if appropriate further additives, in which compounds which are used as the curing compounds
(B) are those which contain at least two enol ether groups of the formula (I)

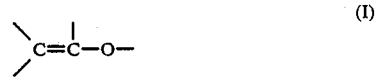

The mixtures according to the invention already cure rapidly at low temperatures and are particularly suitable for the production of shaped articles or coatings or as a constituent in lacquers.

12 Claims, No Drawings

CURABLE MIXTURES AND THEIR USE

DESCRIPTION

It is known from the chemistry of protective groups that compounds containing hydroxyl groups can be reacted with vinyl ethers or enol ethers, such as, for example, tetrahydropyran or 2-methoxypropene, to form acetals. (T. W. Greene, Protective Groups in Organic Synthesis J. Wiley & Sons New York 1981).

It is furthermore known that an acrylate resin containing OH groups or an acrylate resin modified with ε-caprolactone can be used in a mixture with polyisocyanates as a two-component lacquer (German Pat. Nos. 3,005,945, 3,027,776 and 3,148,022). Some of the known products have proved to be particularly useful, although the use of isocyanates is not harmless.

Attempts have therefore also already been made to prepare products which are less harmful to the environment starting from systems without free isocyanate.

In another publication, an acrylate resin containing oxazolidine with which water or atmospheric moisture is used as the curing agent is thus described (European Laid-Open Specification No. 34,720). This system has the disadvantage that the cured surface counteracts deeper penetration of water into the lower layers of the coating and thus prevents complete curing through the entire coating thickness.

A two-component system which reacts without isocyanate is also furthermore known (cf Coating 17 (1984), pages 21-22). This consists of an acrylic resin which contains epoxide groups and can be cured with another acrylic resin containing tertiary amino groups. In the product prepared by this process, the inadequate degree of crosslinking leads to insufficient chemical stability, so that coatings produced with this system are suitable for only a limited field of use.

The invention was therefore based on the object of developing a crosslinking principle which requires no free isocyanates for curing, i.e. is not harmful to the environment, and also to provide curable mixtures which bring about an improvement in respect of the individual above-mentioned disadvantages or at least in respect of their combination.

It has now been found that this object can be achieved, suprisingly, by curable mixtures based on
(A) compounds containing hydroxyl groups,
(B) curable compounds,
(C) catalysts and
(D) if appropriate a diluent and if appropriate further additives,
wherein the compounds which are used as the curing compounds (B) are those which contain a least two enol ether (vinyl ether) groups of the formula (I)

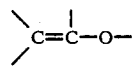
(I)

The invention furthermore relates to the use of these curable mixtures, in particular for the production of shaped articles and coatings and as a constituent in lacquers or adhesives.

The curing agents (B) used according to the invention contain at least two, preferably 2 to 30 and in particular 2 to 10, groups of the formula (I) which are connected indirectly to one another. A possible indirect linkage here is, for example, the radical $R_4$ (see below). This indirect linkage can thereby also be a part of the chain of an oligomer and/or polymer, i.e. the groups (I) can be present in the side chains of the main chain of the polymer or oligomer or can form these side chains. If the groups (I) are contained in an oligomer or polymer, i.e. the curing agent (B) is an oligomer or polymer, the number of groups (I) is in general such that the C=C equivalent weight is between 50 and 1,800, preferably between 200 and 1,200. The molecular weight Mw (weight-average) should generally not exceed 25,000 and is preferably 500 to 20,000, in particular 500 to 10,000.

The curing agents (B) according to the invention preferably have the general formula (II)

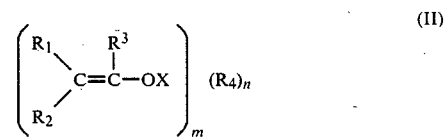

in which:
$R_1$, $R_2$ and $R_3$=identical or different radicals and denote hydrogen, a hydrocarbon radical, preferably an alkyl radical with 1 to 10, in particular 1 to 4, carbon atoms, a cycloalkyl radical with 5 to 12, in particular 6 to 10, carbon atoms or an aryl radical with 6 to 15, in particular 6 to 10, carbon atoms, it also being possible for these radicals $R_1$ to $R_3$ in each case to be a constituent of a preferably five-or six-membered ring;

$R_4$=an m-valent, branched or unbranched hydrocarbon radical which has 1 to 50 carbon atoms, preferably 2 to 30 carbon atoms, and can optionally contain hetero atoms and/or functional groups from the group comprising O and NH, ester, amide, urethane, urea and ether groups;

x=a chemical bond (where n=1), or a hydrocarbon radical, preferably an alkyl radical with 1 to 10, in particular 1 to 4, carbon atoms, a cycloalkyl radical with 5 to 12, in particular 6 to 10, carbon atoms or an aryl radical with 6 to 15, in particular 6 to 10, carbon atoms (where n=0), or together with $R_1$ or with $R_2$ at the same time is a constituent of an optionally substituted, preferably five- or six-membered ring, in which case $R_4$ is then on this ring (where n=1);

m=at least 2, preferably 2 to 30 and in particular 2 to 10; and n=0 or 1; with the proviso that if n=0, one of the radicals $R_1$ to $R_3$ must have the meaning of $R_4$, and if n=1, none of the radicals $R_1$ to $R_3$ has the meaning of $R_4$.

If the radical X is part of a ring system, the corresponding curing agents (B) preferably have the following formula (III) or (IV)

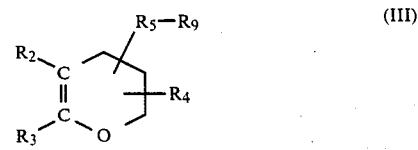

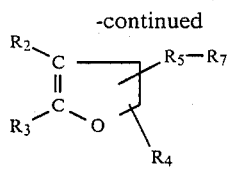
(IV)

in which $R_2$, $R_3$ and $R_4$ have the above meaning and $R_5$ to $R_9$ or $R_5$ to $R_7$ have the same meaning as $R_1$ to $R_3$.

Oligomeric or polymeric curing agents (B) are obtained, for example, by adding low molecular weight bisenol or bisvinyl ethers of the formulae (II) to (IV) onto oligomers or polymers containing OH groups (polyols). The proportions are to be chosen here so that the adducts formed still contain free enol ether or vinyl ether groups. Possible polyols here are in principle the same as those described below for the compounds (A), although for the present purposes the low molecular weight representatives with molecular weights (Mw) of up to 1,000 are generally used. If these adducts also still contain excess OH groups in addition to enol (vinyl) ether groups, they have self-crosslinking properties.

Examples of suitable curing agents (B) which may be mentioned here are: ethylene glycol divinyl ether, butanediol divinyl ether, butanediol diisopropenyl ether, neopentyl glycol diisopropenyl ether and the Tischtschenko ester of dimeric acrolein. Possible oligomeric or polymeric representatives are furthermore addition products of these low molecular weight ethers on polyols, polyols which can be used being: polyhydric alcohols, such as ethanediol, the various propane-, butane-, pentane-, hexane- and octanediols or homologs thereof, the corresponding oligomeric ethers, and furthermore glycerol, trimethylolethane or -propane, hexanetriol, pentaerythritol, dipentaerythritol, sorbitol, polyvinyl alcohol, bisphenol A, resorcinol, hydroquinone or the like, isocyanurates containing OH groups, such as trishydroxyethyl isocyanurate, epoxy resins containing OH groups, polyethers containing OH groups, polyesters containing OH groups or polyacrylates containing OH groups, the molecular weight (Mw) of these polymers preferably being between 500 and 20,000.

Further examples which may be mentioned here are also the reaction products of monovinyl ethers or acetals with the abovementioned polyols, these being obtained by reacting the polyol with the monovinyl ether or with the acetal in a first step to form a new acetal, which is then split in a second step to give a polyvinyl ether. An example which may be mentioned here is the trisisopropenyl ether of trimethylolpropane. Addition products of monovinyl ethers containing hydroxyl groups, such as, for example, ethylene glycol monovinyl ether, 1,4-butylene glycol monovinyl ether or methanoldihydropyran, on polyisocyanates, such as, for example, tetramethylene diisocyanate, hexamethylene diisocyante, 2,2,4-trimethylhexamethylene diisocyanate, dodecane 1,12-diisocyanate, cyclohexane 1,3- and 1,4-diisocyanate, 1-isocyanato-3,3,5-trimethyl-5-isocyanato-methylcyclohexane (=isophorone diisocyanate, IPDI), perhydrodiphenylmethane 2,4'- and/or 4,4'-diisocyanate, phenylene 1,3- and 1,4-diisocyanate, toluylene 2,4- and 2,6-diisocyanate, diphenylmethane 2,4'- and/or 4,4'-diisocyanate, 3,2'- and/or 3,4-diisocyanato-4-methyl-diphenylmethane, naphthylene-1,5-diisocyanate, triphenylmethane 4,4', 4"-triisocyanate or mixtures of these compounds, are also suitable.

As well as these simple isocyanates, those which contain hetero atoms in the radical linking the isocyanate groups are also suitable. Examples of these are polyisocyanates containing carbodiimide groups, allophonate groups, isocyanurate groups, urethane groups, acylated urea groups and biuret groups.

The known polyisocyanates which are chiefly used in the preparation of lacquers, for example modification products, containing biuret, isocyanate or urethane groups, of the abovementioned simple polyisocyanates, in particular tris-(6-isocyanatohexyl)-biuret, or low molecular weight polyisocyanates containing urethane groups, such as can be obtained by reacting excess IPDI with simple polyhydric alcohols in the molecular weight range of 62–300, in particular with trimethylolpropane, are particularly suitable for the process according to the invention. Any desired mixtures of the polyisocyanates mentioned can of course also be used for the preparation of the products according to the invention.

Suitable polyisocyanates are furthermore the known prepolymers containing terminal isocyanate groups, such as are accessible, in particular, by reacting the abovementioned simple polyisocyanates, above all diisocyanates, with less than stoichiometric amounts of organic compounds with at least two groups which are reactive towards isocyanate groups. Such compounds which can be used are, in particular, those with a total of at least two amino groups and/or hydroxyl groups in the molecular weight range from 300 to 10,000, preferably 400 to 6,000. The corresponding polyhydroxy compounds, for example the hydroxypolyesters, hydroxypolyethers and/or hydroxyl-containing acrylate resins which are known per se in polyurethane chemistry, are preferably used.

In these known prepolymers, the ratio of isocyanate groups to hydrogen atoms which are reactive towards NCO is 1.05 to 10:1, preferably 1.1 to 3:1, the hydrogen atoms preferably originating from hydroxyl groups.

The curing component (B) according to the invention is represented in the present description as a uniform chemical individual. In practice, because of the polyfunctionality of starting substances, random mixtures frequently result. This is of no significance for usability as curing agents according to the invention. Mixtures of various enol or vinyl ethers can of course also be used. In some cases, it may be advantageous to use the curing agents (B) according to the invention together with known, preferably isocyanate-free curing agents, such as transesterification curing agents, as long as the catalysts according to the invention do not interfere.

The compounds (A) used according to the invention have hydroxyl groups which react with the enol ether or vinyl ether groups of the curing agent (B) during the curing process. The hydroxy number is in general 30 to 250, preferably 45 to 200 and in particular 50 to 180 mg of KOH/g, whilst the hydroxyl equivalent weight of such compounds (A) is generally between 150 and 1,000, preferably between 200 and 500. These compounds (A) containing OH groups can optionally also contain other functional groups, such as carboxyl groups. However, the acid numbers are thereby in general below 30, preferably below 20. These compounds (A) can also optionally contain C=C double bonds.

The molecular weight (weight-average, Mw) of (A), determined by means of gel chromatography (polystyrene standard), is usually in the range from about 300 to about 50,000, preferably about 5,000 to about 20,000. In special cases, however, the molecular weight can be 100,000 or more. Possible polymers here are polymerization products, polycondensates or polyaddition compounds.

Examples of compounds (A) are synthetic resins containing OH groups (polyols), such as polyether-polyols, polyacetal-polyols, polyesteramide-polyols, epoxy resin-polyols or reaction products thereof with $CO_2$, phenolic resinpolyols, polyurea-polyols, polyurethane-polyols, cellulose ester- and ether-polyols, partly hydrolyzed homo- and copolymers of vinyl esters, partly acetalized polyvinyl alcohols, polyester-polyols or acrylate resin-polyols, the last two being preferred. Such polyols, which can also be used as a mixture, are described, for example in German Offenlegungsschrift No. 31 24 784.

The polyester-polyols which are preferably used are obtained in a known manner by reacting polyhydric, preferably dihydric and if appropriate also trihydric alcohols with polybasic, preferably dibasic, carboxylic acids, if appropriate mixed with monocarboxylic acids. Instead of the free polycarboxylic acids, the corresponding polycarboxylic acid anhydrides or corresponding polycarboxylic acid esters of monohydric alcohols with 1-6 carbon atoms or mixtures thereof can also be used for the preparation of the polyesters.

The polycarboxylic acids can be aliphatic, cycloaliphatic, aromatic and/or heterocyclic in nature and optionally substituted, for example by halogen atoms, and/or unsaturated. Examples which may be mentioned of such carboxylic acids and derivatives thereof are: succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, di- and tetrachlorophthalic acid, endomethylenetetrahydrophthalic acid and its hexachloro derivative, glutaric acid, maleic acid, fumaric acid and—where accessible—anhydrides thereof, dimeric and trimeric fatty acids, such as oleic acid, if appropriate mixed with monomeric fatty acids, dimethyl terephthalate and bis-glycol terephthalate, and furthermore cyclic monocarboxylic acids, such as benzoic acid, ptert.-butylbenzoic acid or hexahydrobenzoic acid.

Possible polyhydric alcohols are, for example, ethylene glycol, propylene 1,2- and 1,3-glycol, butylene 1,4- and 2,3-glycol, di-$\beta$-hydroxyethylbutanediol, hexane-1,6-diol, octane-1,8-diol, neopentyl glycol, cyclohexanediol, 1,4-bis-(hydroxymethyl)-cyclohexane, 2,2-bis-(4-hydroxycyclohexyl)-propane, 2,2-bis-(4-($\beta$-hydroxyethoxy)phenyl)-propane, 2-methyl-1,3-propanediol, glycerol, trimethylolpropane, hexane-1,2,6-triol, butane-1,2,4-diol, tris-($\beta$-hydroxyethyl) isocyanurate, trimethylolethane, pentaerythritol, quinitol, mannitol, sorbitol, formose and hydroxyalkylation products thereof, and furthermore diethylene glycol, triethylene glycol, tetraethylene glycol, polyethylene glycols, dipropylene glycol, triproplylene glycol, polypropylene glycols, dibutylene glycol, polybutylene glycols and xylylene glycol. Polyesters which are obtained from or with lactones, for example $\epsilon$-caprolactone, or hydroxycarboxylic acids, such as, for example, hydroxypivalic acid, $\omega$-hydroxydecanoic acid, $\omega$-hydroxycaproic acid or thioglycollic acid, can also be used.

Preferred polyesters are, for example, also the reaction products of polycarboxylic acids and glycidyl compounds, such as are described, for example, in German Offenlegungsschrift No. 24 10 513.

The polyesters according to the invention are prepared in a manner which is known per se, by methods such as are described in detail, for example, in "Ullmanns Enzyklopädie der technischen Chemie" (Ullmanns Encyclopaedia of Industrial Chemistry), Verlag Chemie Weinheim, 4th edition (1980), Volume 19, pages 61 et seq., or by H. Wagner and H. F. Sarx in "Lackkunstharze" (Lacquer Synthetic Resins), Carl Hander Verlag, Munich (1971), pages 86-152. If appropriate, the esterification is carried out in the presence of a catalytic amount of a customary esterification catalyst, such as, for example, acids, bases or transition metal compounds, for example titanium tetrabutylate, at about 80°-260° C., preferably 100°-200° C. The esterification reaction is carried out until the required values of the hydroxyl and acid number are reached.

Preferred acrylate resin polyols which can be used as component (A) are homo- or copolymers. These are derived, for example, from the following monomers ($b_1$), it being possible for the other monomers ($b_2$) to ($b_7$) also to be used if appropriate:

($b_1$) acrylate and methacrylate (=(meth)acrylate) monomers of the general formula

 (1)

in which R' and X stand for:
$R^1$ = H or methyl;

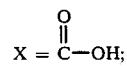

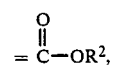

where $R^2$ = an optionally fluorine-containing ($C_1$-$C_{25}$)alkyl radical, preferably ($C_1$-$C_{18}$)alkyl;

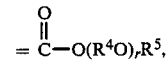

where $R^4$ = branched or unbranched ($C_1$-$C_{16}$)alkyl which can optionally contain hydroxyl groups and/or ester groups, $R^5$ = H or ($C_1$-$C_4$)alkyl, preferably hydrogen, methyl or ethyl, and r = 1 to 10, preferably 1 to 6;

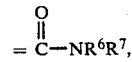

in which $R^6$ denotes H or alkyl with preferably 1 to 6 carbon atoms and $R^7$ independently of $R^6$ denotes H or alkyl with preferably 1 to 6 carbon atoms;
= CN;
= an acyl radical which contains glycidyl groups and preferably has 1 to 6 carbon atoms, in particular the

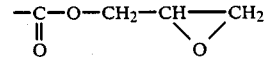

radical;
= an acyl radical which contains carbonate groups and preferably has 1 to 6 carbon atoms, in particular the

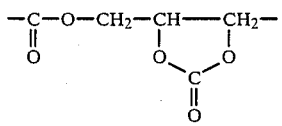

radical,

Representatives of these monomers ($b_1$) are, for example, acrylic or methacrylic acid (=(meth)acrylic acid), and fumaric, maleic or itaconic acid, (meth)acrylic acid being preferred. Examples here are esters of these acids with ethylene glycol, propylene 1,2- or 1,3- glycol, butylene 1,4-glycol, trimethylolpropane, glycerol and the like; and furthermore reaction products of these acids with terminal epoxides, such as, for example, hexene oxide or dodecene oxide, and reaction products of these acides with glycidyl esters, preferably of saturated aliphatic monocarboxylic acids which are branched in the α-position and have 8–14 carbon atoms, such as, for example, $^{(R)}$Cardura E 10 (glycidyl ester of "versatic acid"). If corresponding esters of unsaturated dicarboxylic acids are used, these should contain only one C=C double bond. Hydroxy ethyl or hydroxypropyl (meth)acrylate are preferred. Particularly elastic properties are to be obtained when a reaction product of a hydroxyalkyl (meth)acrylate with ε-caprolactone is used. Further functional esters which can be used are glycidyl methacrylate and the cyclic carbonate obtained therefrom by adding on carbon dioxide.

($b_2$) Olefins, such as ethylene and propylene; Vinylaromatic hydrocarbons, such as, preferably, styrene or substituted styrenes, such as α-methylstyrene and p-methylstyrene;

($b_4$) esters, acids, amides or nitriles of unsaturated mono- or dicarboxylic acids. The esters are preferred here. Possible acids are the same as those mentioned above under ($b_1$). The alcohol component in the esters in general contains 1 to 18, preferably 1 to 13, carbon atoms. Examples of these are: the methyl, ethyl, butyl, 2-ethylhexyl, lauryl or stearyl esters of (meth)acrylic acid. Suitable alcohol components are also fatty alcohols, cycloalcohols, monoalkyl ethers of ethylene glycols or propylene glycols and versatic alcohol. Possible acids are, for example: acrylic, methacrylic, maleic, fumaric or itaconic acid and 2-acrylamido-2-methylpropanesulfonic acid. In addition, substituted and unsubstituted amides of these acids are also suitable. Substituted amides can be: mono- and dialkylamides with 1 to 10 carbon atoms in the alkyl radical, etherified and non-etherified hydroxyalkylamides with 1 to 6 carbon atoms in the alkyl moiety and in the ether moiety and mono- and dialkylaminoalkylamides with 1 to 6 carbon atoms in the alkyl radical. Concrete examples which may be mentioned here are: (meth)acrylamide and hydroxyethyl- or hydroxypropyl-(meth)acrylamide. (Meth)acrylonitrile may be mentioned as an example of a nitrile;

($b_5$) Unsaturated esters of an aliphatic, saturated monocarboxylic acid which is preferably branched in the α-position, for example vinyl esters of carboxylic acids with 2 to 20, preferably 2 to 6, carbon atoms, such as vinyl acetate, vinyl propionate and vinyl linolate. However, these are preferably vinyl esters of carboxylic acids which are branched in the α-position and have 8 to 14 carbon atoms, in particular α-monoalkane- or α-dialkanemonocarboxylic acids, such as the so-called "versatic acids" (vinyl versatate);

($b_6$) Vinyl compounds (other than vinyl esters), such as vinyl ethers, for example methyl, ethyl or alkyl vinyl ethers with alkyl radicals with 3 to 6 carbon atoms; allyl ethers, such as allyl glycidyl ether and N-vinylpyrrolidone;

($b_7$) Monomers with urethane groups, such as vinylurethanes, which are obtained by reacting vinyl isocyanate with customary masking agents; examples of this last group are: tert.-butyl N-vinylcarbamate, cyclohexyl N-vinylcarbamate and the adduct of N-vinylcarbamic acid and β- caprolactam.

Within the above groups ($b_1$) to ($b_7$), mixtures of the individual representatives can also be used.

These acrylate resin-polyols are prepared here in a known manner, preferably by the free radical chain mechanism and by the customary methods of bulk, solution, precipitation, dispersion, emulsion or bead polymerization. Bulk, solution or emulsion polymerization is preferred. Customary initiators which form free radicals are used to start the polymerization. Examples of suitable initiators are hydrogen peroxide, organic hydroperoxides and peroxides, such as di-tert.-butyl peroxide, t-butyl perbenzoate, dicumyl peroxide, p-menthane hydroperoxide, tert.-butyl hydroperoxide, cumene hydroperoxide and succinic acid peroxide, and furthermore aliphatic azo compounds which dissociate into free radicals under polymerization conditions, such as 2,2-azo-bis-2,4-dimethylvaleronitrile, 2,2-azo-bis-isobutyronitrile and analogous azonitriles. The initiators are in general used in an amount of 0.05 to 5% by weight, preferably 0.1 to 3.0% by weight, based on the amount of monomer. The optimum amount and the initiator with the optimum action can easily be determined by experiments.

In certain cases, it may be desirable for other agents which modify the chain length (regulators), such as mercaptans, dimerized α-methylstyrene and similar compounds, also to be added to the polymerization mixture. 0.1 to 5.0% by weight, preferably 0.1 to 3.0% by weight, based on the total amount of monomers, of these compounds are in general used.

If the polymerization is carried out in solution, the customary organic solvents which are inert under the polymerization conditions, such as, for example, halogenated hydrocarbons, ethers, such as diethyl ether, diethylene glycol dimethyl ether, tetrahydrofuran or dioxane, ketones, such as, for example, methyl ethyl ketone, acetone, cyclohexanone and the like, esters, such as butyl acetate, ethyl glycol acetate, methyl glycol acetate and methoxypropyl acetate, and aliphatic or aromatic hydrocarbons, such as hexane, heptane, cyclohexane, benzene, xylene and toluene, are suitable. The solvents can be used here individually or as a mixture.

Other acrylate resin-polyols which are suitable for the purpose according to the invention are described, for example, in German Patent Application No. P 36 44 372.7 and in European Patent Application No. 86.117 167.6

The proportion of components (A) and (B) in relation to one another depends on the number of hydroxyl groups in compound (A) and the sum of the double bonds in compound (B). To achieve an adequate crosslinking density, the ratio of active H atoms (hydroxyl groups) in (A) to double bonds in (B) is in general about 2:1 to 1:2, preferably about (0.8 to 1:2):1 to about 1:(0.8 to 1.2).

Suitable components (C) (catalysts) are Lewis and Brönstedt acids, preferably the latter. Examples of these are sulfuric acid, sulfonic acids, such as, for example, p-toluenesulfonic acid, methanesulfonic acid, benzenesulfonic acid, dodecylbenzenesulfonic acid, alkylxylenesulfonic acids, dinonylnaphthalenesulfonic acid, camphorsulfonic acid, naphthalenedisulfonic acid and dinonylnapthalenedisulfonic acid and salts thereof with pyridine; boron trifluoride and complexes thereof with ethers and/or alcohols may furthermore be mentioned here. The amount of catalyst is in general 0.01 to 5, preferably 0.02 to 2% by weight, based on the sum of components (A) and (B). It can be varied according to the reactivity of compounds (A) and (B), the nature of any solvent present, the activity of the catalyst and the intended process procedure.

The diluents which may optionally be present according to the invention as component (D) in the curable mixtures should be inert towards the components of the mixture. Suitable diluents here are the customary organic solvents, such as, for example, halogenated hydrocarbons, ethers, such as diethyl ether, dimethyldiglycol, tetrahydrofuran or dioxane, ketones, such as, for example, methyl ethyl ketone, acetone, cyclohexanone and similar compounds, esters, such as butyl acetate, ethylglycol acetate, methylglycol acetate and methoxypropyl acetate, and aliphatic and/or aromatic hydrocarbons, such as hexane, heptane, cyclohexane, benzene, xylene, toluene and aromatic solvents in the boiling range from about 150° to 180° C. (higher-boiling mineral oil fractions, such as $^{(R)}$Solvesso). The solvents can thereby be used individually or as a mixture, and in the latter case especially if the dissolving power of the individual solvent is not sufficient, since its polarity under certain circumstances is too low.

In the context of component (D), the mixtures according to the invention can also contain the customary additives, such as dyestuffs, pigments, pigment pastes, fillers, plasticizers, antioxidants, stabilizers, surface-active agents, flow control and thickening agents, reactive diluents and neutralizing substances. These additives are used in the customary amounts and can optionally be first added to the mixtures according to the invention directly before processing.

Examples which may be mentioned of dyestuffs or pigments, which can be of an inorganic or organic nature, are: titanium dioxide, graphite, carbon black, zinc chromate, strontium chromate, barium chromate, lead chromate, lead cyanamide, lead silicochromate, calcium molybdate, manganese phosphate, zinc oxide, zinc sulfide, cadmium sulfide, chromium oxide, nickel titanium yellow, chromium titanium yellow, iron oxide red, iron oxide black, ultramarine blue, phthalocyanine complexes, naphthal red or the like.

Suitable fillers are, for example, talc, mica, kaolin, chalk, quartz flour, asbestos flour, ground shale, barium sulfate, various silicic acids, silicates or the like.

To prepare the curable mixtures according to the invention, components (A), (B) and (C) and if appropriate also (D) are mixed. In the case of components of low viscosity, this can be carried out in bulk, the mixture being warmed, if appropriate, to higher temperatures. Products of higher viscosity—if the curable mixtures are not used as powder lacquers—are dissolved or dispersed in the above diluents before mixing.

Curing of the mixtures according to the invention proceeds very rapidly in the presence of the curing catalysts and in general takes place at $-10°$ to 180° C., preferably 0 to 100 and in particular 20° to 80° C. For example, products of good hardness are already obtained at room temperature after 2 to 24 hours or at 60° C. after 10 to 40 minutes.

Since oligomeric and/or polymeric compounds (A) and (B) are preferably used as starting substances, oligomeric and/or polymeric crosslinked reaction products are obtained.

The curing reaction can be carried out in one stage, for example by using equivalent proportions of components (A) and (B). The pot life and properties of the product therefore depend on the process conditions, i.e. on the nature and amount of the starting substances, the dosage of the catalyst and the temperature program. The elasticity of the crosslinked product can thus be controlled within a tolerance range, for example by the chain length of the oligomers and/or polymers are used for (A) and (B). Although curing as a rule is performed discontinuously, it also lies within the scope of the invention to carry out mixing of the components and the reaction procedure continuously, for example by means of an automatic lacquering device.

The mixtures according to the invention show pot lives which vary between 5 minutes and about 12 hours, depending on the choice of compound (A) and (B) and on the nature and amount of the catalyst or catalyst combination thereof. A high processing reliability is thereby guaranteed. On the basis of this advantageous property of the product, in connection with its rapid and absolute curing at room temperature or elevated temperature and its chemical stability, it is outstandingly suitable as a binder for lacquers.

Because of their favorable properties, the mixtures according to the invention can find diverse technical use, for example for the production of shaped articles (casting resins), for example for toolmaking, or for the production of coatings and/or intermediate coatings on many kinds of substrates, for example on those of an organic or inorganic nature, such as wood, wood fiber materials (sealing wood), textiles of natural or synthetic origin, plastics, glass, ceramics and building materials, such as concrete, fiberboards and artificial stone, but in particular on metal. The mixtures according to the invention can furthermore be used as constituents of adhesives, putties, laminating resins and synthetic resin cements, and in particular as constituents of paints and lacquers for coating industrial objects, domestic appliances, furniture and in building, such as, for example, refrigeration units, washing machines, electrical appliances, windows and doors. They can be applied by brushing, spraying or dipping, or electrostatically.

A preferred field of use for the mixture according to the invention is the preparation of motor vehicle lacquers (base and/or top lacquers) and in particular car repair lacquers. The resistance to xylene and thus at the same time is a good resistance towards supergrade petrol is above all of interest here. Since the mixtures according to the invention in a preferred embodiment of the invention can cure by themselves at room temperature in a relatively short time without substances which pollute the environment being released, use as a car repair lacquer is of considerable practical importance.

In the following instructions and examples, % in each case denotes % by weight and p in each case denotes parts by weight. Reduced pressure is in each case understood as being that of a waterpump.

EXAMPLES (a) Preparation of the curing component (B)

(1) 12.3 parts of trimethylolpropane and 66.7 parts of 3,4-dihydro-2H-pyran-2-yl-methyl 3,4-dihydro-2H-pyran-2-carboxylate (abbreviated to DHPDHPC below) were suspended in 34 parts of butyl acetate and, after addition of 0.1 part of dodecylbenzenesulfonic acid, the suspension was stirred at room temperature for 24 hours. After filtration, a colorless resin solution was obtained. Equivalent weight: 380; solids content: 70%.

(2) 24.2 parts of trishydroxyethyl isocyanurate and 55.8 parts of DHPDHPC were suspended in 33 parts of butyl acetate and, after addition of 0.1 part of dodecylbenzenesulfonic acid, the suspension was stirred at room temperature until the precipitate had dissolved. After filtration, a clear resin solution was obtained. Equivalent weight: 718; solids content: 71%.

(3) 14.3 parts of trimethylolpropane and 65.7 parts of DHPDHPC were suspended in 36 parts of butyl acetate and, after addition of 0.15 part of camphorsulfonic acid, the suspension was stirred at room temperature. After 24 hours, the mixture was filtered. A colorless resin solution was obtained. Equivalent weight: 435; solids content: 69%.

(4) 191 parts of a polyisocyanate containing cyanurate groups and based on hexamethylene diisocyanate (Desmodur[R] N 3300) and 19 parts of trimethylhexamethylene diisocyanate were dissolved in 149 parts of propylene glycol monomethyl ether-acetate and, after addition of 0.1 part of dibutyltin dilaurate, a mixture of 137 parts of 1,4-butylene glycol monovinyl ether and 0.35 part of hydroquinone monomethyl ether was added at 50° C. within 40 minutes. The mixture was then subsequently stirred until the isocyanate content was <0.1%. A pale yellow resin solution was obtained. Equivalent weight: 420; solids content: 70%.

(5) 245 parts of a polyisocyanate containing cyanurate groups and based on isophoron diisocyanate (N=C=O content: 17.1%) were dissolved in 241 parts of butyl acetate and, after addition of 0.1 part of dibutyltin dilaurate, a mixture of 116 parts of 1,4-butyleneglycol monovinyl ether and 0.5 part of hydroquinone monomethyl ether was added at 50° C. within 60 minutes. The mixture was then subsequently stirred until the isocyanate content was <0.1%. A slightly yellowishcolored resin solution was obtained. Equivalent weight: 600; solids content: 60%.

(b) Preparation of the curable mixture and technological testing of the curing product The following resins containing OH groups were used in dissolved form as the binder (=component (A)).

| No. | Name | Feature | OH number | Solids content (% by weight) |
|---|---|---|---|---|
| 1 | ® Synthacryl SC 303 | acrylate resin containing hydroxyl groups | 78[1] | 65[2] |
| 2 | ® Macrynal SM 510 n | acrylate resin containing hydroxyl groups | about 160[1] | 60[3] |
| 3 | ® Macrynal VSM 2155 | acrylate resin containing hydroxyl groups | about 200[1] | 60[4] |
| 4 | ® Alftalat AN 950 | polyester resin containing hydroxyl groups | 95[1] | 70[5] |

[1] determined in accordance with DIN 53783, based on solid resin
[2] dissolved in butyl acetate
[3] dissolved in xylene/ethylglycol acetate (2:1)
[4] dissolved in ethylglycol acetate
[5] dissolved in xylene The following compounds were used in the form of corresponding solutions as catalysts (=component (C));

| No. | Structure | Solvent | Solids content (% by weight) |
|---|---|---|---|
| 1 | p-toluenesulfonic acid | diglycol dimethyl ether | 10 |
| 2 | dodecylbenzenesulfonic acid | butyl acetate | 10 |
| 3 | camphorsulfonic acid | diglycol dimethyl ether | 10 |
| 4 | dinonylnaphthalene-disulfonic acid | butyl acetate | 10 |
| 5 | dinonylnaphthalene-monosulfonic acid | butyl acetate | 10 |

To prepare the curable mixtures, the amounts by weight of binder and curing agent shown in the following table were mixed and the mixture was diluted with butyl acetate to a solids content of 50%. After admixing the catalyst mentioned, the resulting coating material was applied by means of a doctor blade to glass plates in a wet film thickness of 100 μm and cured at room temperature and at 60° C. (45 minutes).

The abbreviations used in the table below have the following meanings:
HC: hot curing=45 minutes at 60° C.
RT: room temperature
pass: no damage to the lacquer film detectable
DHPDHPC: 3,4-dihydro2H-pyran-2yl-methyl 3,4-dihydro-2H-pyran-2-carboxylate
s. diss.: slight dissolving of the film surface
diss.: dissolving of the film surface.

TABLE

| | Clearcoat film (100μ wet film) | | | | | | | | | |
|---|---|---|---|---|---|---|---|---|---|---|
| | Binder (Component A) | | Curing agent (Component B) | | Catalyst (Component C) | | Curing | Pendulum hardness according to Konig (s) | | Resistance to (after 10 days) | |
| Example | Type | Amount | Type | Amount | Type | Amount | temperature | after 1 day | 10 days | premium petrol | xylene |
| 1 | 1 | 66.3 | 2 | 29.3 | 1 | 0.13 | HC | 132 | 158 | s. diss. | diss. |
| 2 | 2 | 46.8 | 1 | 25.6 | 1 | 0.30 | RT | 106 | 163 | pass | diss. |
| 3 | 2 | 46.8 | 2 | 39.0 | 1 | 0.40 | RT | 95 | 152 | pass | s. diss. |
| 4 | 2 | 46.8 | DHPDHPC | 8.3 | 1 | 0.31 | RT | 112 | 174 | pass | s. diss. |
| 5 | 2 | 46.8 | 3 | 32.7 | 4 | 0.20 | RT | 115 | 168 | pass | s. diss. |
| 6 | 2 | 46.8 | 2 | 37.0 | 3 | 0.30 | HC | 147 | 187 | pass | pass |
| 7 | 2 | 46.8 | 2 | 38.5 | 2 | 0.40 | HC | 143 | 175 | pass | pass |

TABLE-continued

| | Binder (Component A) | | Curing agent (Component B) | | Catalyst (Component C) | | Curing temperature | Clearcoat film (100μ wet film) Pendulum hardness according to Konig (s) | | Resistance to (after 10 days) | |
|---|---|---|---|---|---|---|---|---|---|---|---|
| Example | Type | Amount | Type | Amount | Type | Amount | | after 1 day | 10 days | premium petrol | xylene |
| 8 | 3 | 46.7 | 2 | 48.8 | 1 | 0.20 | RT | 94 | 150 | pass | pass |
| 9 | 3 | 46.7 | DHPDHPC | 10.9 | 4 | 0.10 | RT | 101 | 153 | pass | pass |
| 10 | 4 | 50.7 | 2 | 30.0 | 2 | 0.35 | HC | 93 | 145 | s. diss. | diss. |
| 11 | 4 | 50.7 | 1 | 20.5 | 1 | 0.50 | HC | 100 | 147 | diss. | diss. |
| 12 | 2 | 59.0 | 5 | 42.0 | 4 | 0.70 | HC | 92 | 148 | pass | s. diss. |
| 13 | 3 | 47.0 | 5 | 42.0 | 5 | 0.90 | HC | 100 | 164 | pass | pass |
| 14 | 2 | 59.0 | 6 | 60.0 | 4 | 0.80 | HC | 94 | 158 | pass | pass |
| 15 | 3 | 47.0 | 6 | 60.0 | 4 | 0.70 | HC | 105 | 172 | pass | pass |

I claim:
1. A curable mixture based on
(A) compounds containing hydroxyl groups,
(B) curable compounds,
(C) catalysts and
(D) if appropriate a diluent and if appropriate further additives,
in which compounds which are used as the curing compound (B) are those which contain at least two enol ether groups of the formula (I)

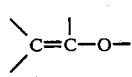
  (I)

2. A curable mixture as claimed in claim 1 in which the curing compounds (B) contains 2 to 30 groups of the formula (I).
3. A curable mixture as claimed in claim 1 in which the curing compounds (B) have the following formula (II)

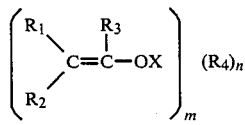
  (II)

in which:
R₁, R₂ and R₃=identical or different radicals and denote hydrogen, a hydrocarbon radical, preferably an alkyl radical with 1 to 10 carbon atoms, a cycloalkyl radical with 5 to 12 carbon atoms or an aryl radical with 6 to 15 carbon atoms, it also being possible for these radicals R₁ to R₃ in each case to be a constituent of a preferably five- or six-membered ring;
R₄=an m-valent, branched or unbranched hydrocarbon radical which has 1 to 50 carbon atoms and can optionally contain hetero atoms and/or functional groups from the group comprising O and NH, ester, amide, urethane, urea and ether groups;
x=a chemical bond (n=1), or a hydrocarbon radical, preferably an alkyl radical with 1 to 10 carbon atoms, a cycloalkyl radical with 5 to 12 carbon atoms or an aryl radical with 6 to 15 carbon atoms (n=0), or together with R₁ or with R₂ at the same time is a constituent of an optionally substituted five- or six-membered ring, in which case R₄ is then on this ring (n=1);
m=at least 2; and
n=0 or 1; with the proviso that if n=0, one of the radicals R₁ to R₃ must have the meaning of R₄, and if n=1, none of the radicals R₁ to R₃ has the meaning of R₄.

4. A curable mixture as claimed in claim 1 in which the curing compound (B) has the formula (III) or (IV)

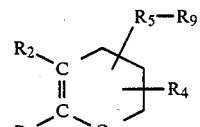
  (III)

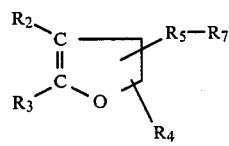
  (IV)

in which R₂, R₃ and R₄ have the above meaning and R₅ to R₉ or R₅ to R₇ have the same meaning as R₁ to R₃.

5. A curable mixture as claimed in claim 1 in which the compounds (B) are those from the group comprising ethylene glycol divinyl ether, butanediol divinyl ether, butanediol diisopropenyl ether, neopentylglycol diisopropenyl ether, the Tischtschenko ester of dimeric acrolein or addition products of these low molecular weight ethers on polyols.

6. A curable mixture as claimed in claim 1 in which the compounds (B) are addition products of monovinyl ethers containing hydroxyl groups on polyisocyanates.

7. A curable mixture as claimed in claim 1 in which the ratio of active H atoms in compound (A) to double bonds in compound (B) is 2:1 to 1:2.

8. A curable mixture as claimed in claim 1 in which compound (A) has a hydroxy number of 30 to 200.

9. A curable mixture as claimed in claim 1 in which compound (A) is an OH-containing polyester, polyether, polyacetal, polyester-amide, epoxy resin, phenol/formaldehyde resin, polyurethane, polyurea, cellulose ester, cellulose ether or acrylate resin or a partially hydrolyzed homo or copolymer of a vinyl ester or a partly acetalized polyvinyl alcohol.

10. A method of using a mixture as claimed in claim 1 for the production of shaped articles or coatings.

11. A method of using a mixture as claimed in claim 1 as a constituent in coatings or adhesives.

12. A method of using as claimed in claim 11 wherein the coatings are car topcoats or car refinishing coats.

* * * * *